United States Patent [19]
Hesskamp et al.

[11] 3,850,266
[45] Nov. 26, 1974

[54] PARKING BRAKE

[75] Inventors: Arthur W. Hesskamp, Birmingham; Paul B. Hellens, Southfield; Albert J. Di Matteo, Metamora, all of Mich.

[73] Assignee: Chrysler Corporation, Highland Park, Mich.

[22] Filed: Aug. 3, 1973

[21] Appl. No.: 385,614

[52] U.S. Cl................. 188/70 R, 74/567, 188/332, 192/65, 192/75, 192/93 R
[51] Int. Cl............................................ F16d 63/00
[58] Field of Search.......... 188/70 R, 329, 330, 332, 188/338, 339, 324, 342; 192/75, 78, 65, 93 R; 74/567

[56] References Cited
UNITED STATES PATENTS

| 3,212,608 | 10/1965 | Weston | 188/332 |
|---|---|---|---|
| 3,557,912 | 1/1971 | MacAfee | 188/70 R |
| R19,012 | 11/1933 | Poulet | 188/332 |

FOREIGN PATENTS OR APPLICATIONS

| 707,074 | 6/1941 | Germany | 188/70 R |
|---|---|---|---|
| 1,060,094 | 11/1953 | France | 188/329 |

*Primary Examiner*—George E. A. Halvosa
*Attorney, Agent, or Firm*—Talburtt & Baldwin

[57] ABSTRACT

Vehicle disc brake having drum type parking brake operable on the inside of the disc. The actuator for spreading the parking brake shoe assemblies includes a pair of actuating plates one of which is secured to a rotatable shaft, and the other of which is rotatable by the first plate and adapted to engage the shoe assemblies for spreading the same.

10 Claims, 6 Drawing Figures

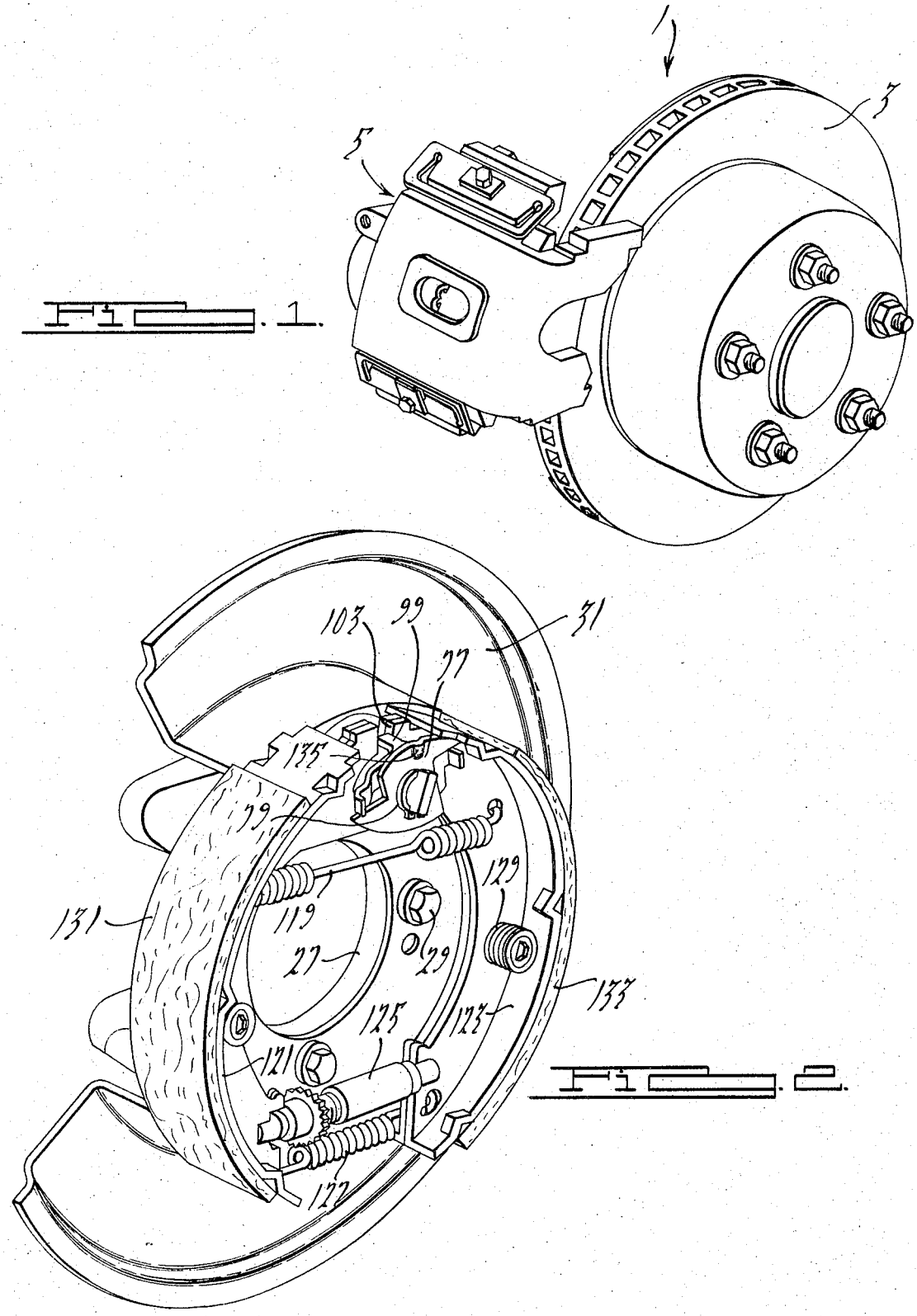

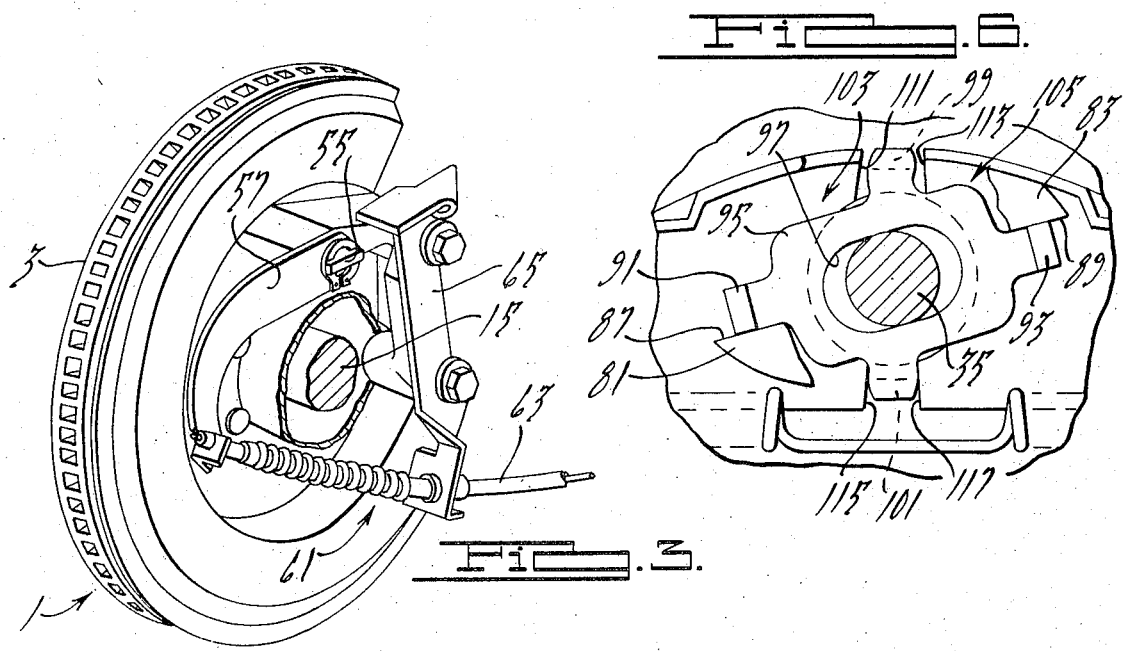

PARKING BRAKE

BACKGROUND OF THE INVENTION

This invention relates to brakes for vehicles, and more particularly to a manually operated parking brake adapted to engage the inner periphery of a disc forming part of a disc-type brake.

It has been proposed in the prior art to provide an independent mechanically operated brake which functionally engages the outer or inner peripheral surface of the disc of a fluid-actuated disc brake structure. Such structures usually included a disc brake having one or more pistons located on one side or opposite side of a rotatable disc. The piston or pistons are hydraulically actuated to force brake linings into engagement with the disc. The housing structure for the piston or pistons normally takes up considerable space. One type of parking brake-actuating device in these structures is, due partly to the space requirement for the housing or calipers, usually located a point spaced circumferentially from the caliper, and is adapted to actuate a pair of brake shoes against an internal annular surface of the disc, which surface constitutes a drum. The present invention relates to such a parking brake device.

BRIEF SUMMARY OF THE INVENTION

Briefly, this invention comprises a drum type parking brake for a disc brake, the parking brake including novel means for applying brake shoes to the drum.

One of the primary objects of this invention is to provide a disc brake having a manually operated parking brake which engages an inner peripheral surface of the disc and operates on the duo-servo brake principle.

Another object of the present invention is to provide a parking brake of the type described which acts substantially uniformly in both forward and reverse brakings.

A further object of this invention is to provide a parking brake such as described which may be used in disc brakes having limited space for parking brake apparatus.

Another object is to provide a parking brake of the class described which is easy to install, simple and economical in construction, and efficient in operation.

Other objects and advantages will be made apparent as the description progresses.

BRIEF DESCRIPTION OF THE DRAWINGS

In the accompanying drawings, in which one of several possible embodiments are illustrated, FIG. 1 is a perspective view of a disc brake assembly having a parking brake of this invention incorporated therein;

FIG. 2 is an enlarged perspective view of the parking brake assembly;

FIG. 3 is a perspective view similar to FIG. 1 taken from the opposite side of the disc, certain parts being removed for clarity;

FIG. 5 is a side elevation of the disc brake and parking brake, certain parts being removed for clarity; and FIG. 6 is an enlarged fragmentary view of FIG. 5, certain parts being broken away and removed for clarity.

Like parts are shown by corresponding reference characters throughout the several views of the drawings.

DESCRIPTION OF THE PREFERRED EMBODIMENT

Figure 4:
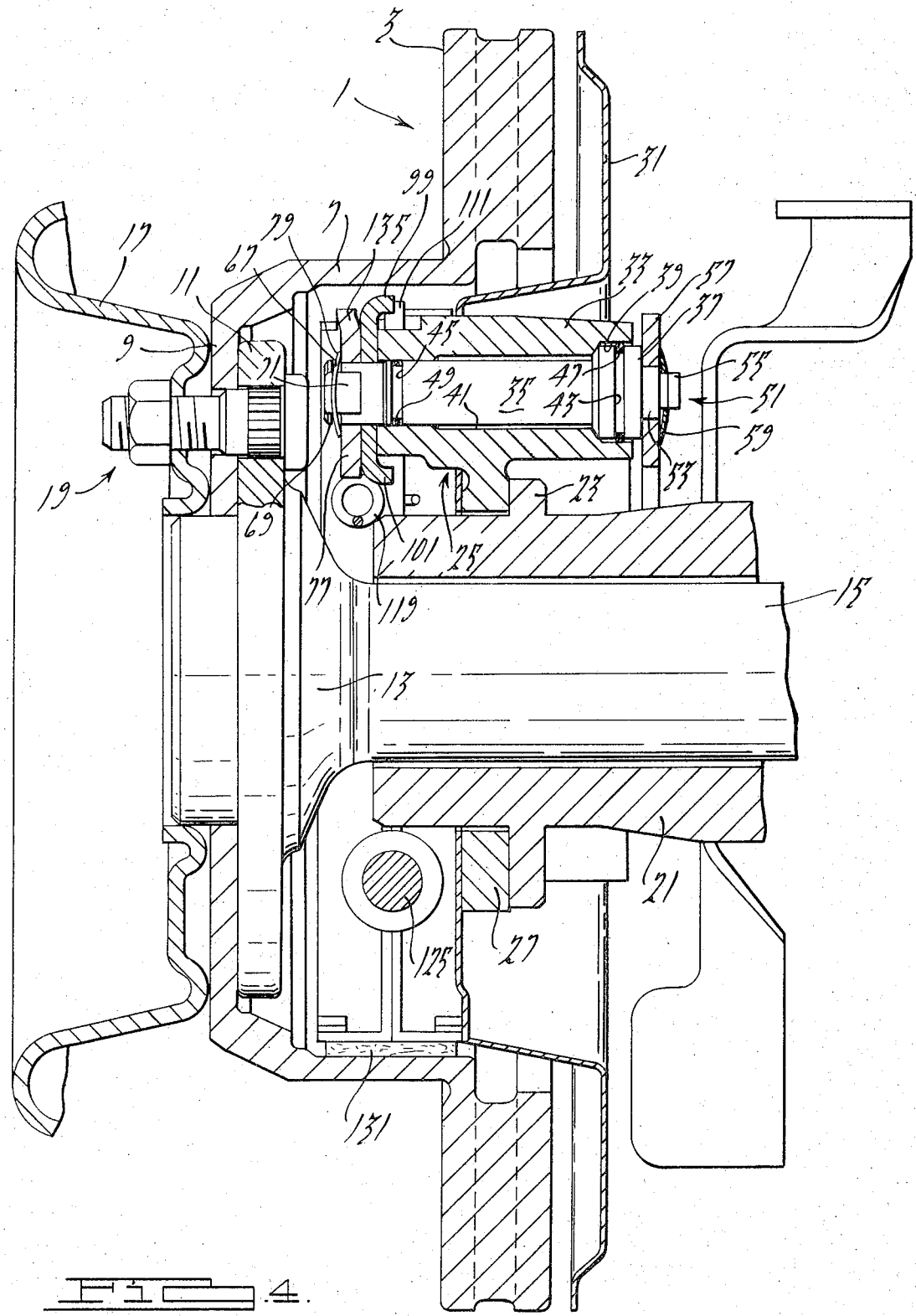
FIG. 4 is an enlarged vertical section through the disc brake assembly.

Referring now to the drawings, a disc for a disc brake is generally indicated at 1. The disc 1 includes an annular disc brake portion 3 adapted to be engaged by brake pads (not shown) forced against the portion by a caliper assembly 5. Extending axially from the inside edge of the annular portion 3 is a drum section 7 having a radially extending flange 9 secured to a flange 11 of a hub 13 on the end of a driven axle 15.

A wheel 17 is secured to the flanges 9 and 11 by conventional fasteners 9. A relatively fixed force receiving member 21 surrounds axle 15 and has a lip 23 thereon. An adapter 25 having a radial flange 27 is located adjacent lip 23 and fasteners 29 connect the lip adapter flange and a dust shield 31 together.

Adapter 25 has an anchor sleeve portion 33 through which a shaft 35 extends. Shaft 35 has an enlarged head 37 at one end which extends into a counterbored section 39 of the bore 41 through anchor sleeve 33. Head 37 has a groove 43 and shaft 35 at a point towards its other end and has a groove 45 in which seals 47 and 49 are located.

The inside end of shaft 35 adjacent head 37 has a machined projection 51 formed by a neck 53 and end head 55. Neck 53 is flatted and has one end of a lever 57 mated therewith. A retainer 59 prevents the axial removal of lever 57. A cable 61 is attached to the other end of lever 57 with the sheath 63 of the cable assembly secured by bracket 65 to the adapter 25. As will be made apparent, cable 61 is the actuating means for the parking brake.

The outside end of shaft 35 has an annular groove 67 forming an end head 69 thereon. The end of the shaft has two flats 71 which mate with flats 73 on an opening 75 in actuating plate 77 forming part of the shoe spreader means. A retainer 79 provides an inwardly directed bias on actuating plate 77.

Plate 77 is generally S-shaped and includes arms 81 and 83 extending in opposite directions from a central portion 85. The arms 81 and 83 have flat camming shoulders 87 and 89 respectively. The shoulders 87 and 89 respectively engage tabs 91 and 93 extending away from a shoe-engaging member 95. Member 95 also has an opening 97 therein through which shaft 35 extends. The dimensions of opening 97 are such that the member 95 may partake of a sliding and rotational movement with respect to shaft 35. This movement is achieved by providing opening 97 with a width dimension approximately the same as the diameter of shaft 35 and a length dimension greater than the diameter of shaft 35.

Member 95 also has two shoe-engaging tabs 99 and 101 which extend away from member 95 in a direction opposite to that of tabs 91 and 93. The tabs 99 and 101 extend between the opposite upper ends of the webs 103 and 105 of brake shoe assemblies 107 and 109. More specifically, the tab 99 extends between the upper edges 111 and 113 of the upper ends of webs 103 and 105 while the tab 101 extends between the lower edges 115 and 117 of the upper ends of webs 103 and 105.

The upper ends of the webs 103 and 105 are biased against anchor sleeve 33 by a spring 119 which extends between the webs. Brake shoe assemblies 107 and 109 include rim portions 121 and 123 secured to webs 103 and 105. An adjuster 125 extends between lower portion of webs 103 and 105 and the webs are held against the adjuster by a spring 127. The webs 103 and 105 are attached to plate 31 and adapter 27 by conventional spring assemblies 129.

Secured to the outside of rims 121 and 123 are brake linings 131 and 133. These linings are adapted to engage the inside surface of drum 7 of the rotor or disc 1 for inhibiting rotation of the latter when the rims are moved away from one another.

Inasmuch as actuating plate 77 appears similar when viewed from either side thereof, a dimple or lip 135 is provided to prevent assembly of the plate in an inoperative position. As shown in FIG. 4, dimple 135 extends toward the outside of the assembly if installed properly. If an attempt is made to reverse the plate 77 and install it in an improper position the dimple 135 will engage the member 95 and hold the plate away from member 95 to such an extent that retainer 79 cannot be installed, thereby preventing such improper installation.

Operation of the parking brake apparatus of this invention is as follows:

A pulling force applied to cable 61 urges the same in a counterclockwise direction as viewed in FIG. 3. First, let it be assumed that the vehicle is stopped and on a flat surface without any tendency to roll. Rotation of the lever 57 causes clockwise rotation of shaft 35 as viewed in FIGS. 5 and 6, which causes actuating plate 77 to likewise rotate. The camming shoulders 87 and 89 engage tabs 91 and 93 and rotate the member 95 around the shaft 35 causing tab 99 to engage edge 113 and tab 101 to engage 115. The continued movement of member 95 forces both of the upper ends of the webs 103 and 105 to be forced away from one another and from anchor sleeve 33 thereby forcing the linings 131 and 133 against the inside surface of drum 7, and applying a braking force.

If the wheel and disc assembly begin to rotate in a clockwise direction, as viewed in FIG. 5, the frictional force applied between the drum 7 and the linings 131 and 133 will cause the shoe assemblies 107 and 109 and adjuster 125 and springs 119 and 127 to shift in a clockwise direction with the drum thereby forcing the upper end of the web 103 against the anchor sleeve 33. The tab 101 is forced to the right as viewed in FIGS. 5 and 6, and since the tabs 91 and 93 must slide along the camming shoulders 87 and 89 due to the fact that the plate 77 is held against rotation, the member 95 slides to the right on shaft 35, with tab 99 engaging the edge 113 to maintain the lining 133 in engagement with the inside of the drum.

If the wheel and disc are rotating or have a tendency to rotate in a clockwise direction when the parking brake cable 61 is actuated, the shoes are initially moved outwardly slightly in the manner described above. As soon as the linings 131 and 133 engage the drum, the upper end of shoe web 103 is jammed against the anchor 33. Further rotation of actuator plate 77 as a result of rotation of lever 57 causes the member 95 to rotate. Since the point of contact between tab 101 and edge 115 is relatively fixed against movement in a horizontal forward or reverse direction as shown in FIG. 5, due to the engagement of web 103 with the anchor sleeve, the member 95 pivots about such contact point and also slides over shaft 35, thereby causing tab 99 to engage the upper edge 113 of web 105 and apply the actuating force thereto.

If the wheel and disc are rotating or have a tendency to rotate in a counterclockwise direction when the cable 61 is actuated, the web 105 is forced against the anchor sleeve 33. The member 95 thus is pivoted about the point of contact between upper tab 99 and the edge 113, thereby causing the actuating force to be applied by tab 101 to the edge 115 of web 103, with the latter web and associated shoe components being moved by said tab 101.

It will thus be seen that the various components cooperate to provide an effective drum parking brake for a disc brake assembly. The components provide a duo servo braking action with the actuating force being applied regardless of the direction which the wheel and disc may have a tendency to move. The apparatus fits conveniently within a drum provided in the disc assembly.

In view of the foregoing it will be seen that the several objects and advantages are achieved.

Although only one embodiment of the invention has been disclosed and described, it is apparent that other embodiments and modifications of the invention are possible.

We claim:

1. Parking brake apparatus for a vehicle wheel having a disc brake, said disc having a drum portion, support means, a pair of brake shoe assemblies having linings engageable with the drum portion, and means to move said shoe assemblies toward said drum portion, said means including spreader means located between the upper ends of said shoe assemblies, said spreader means including a rotatable shaft, and means connected to said shaft for engaging the adjacent ends of said shoe assemblies and forcing them apart upon rotation of said shaft, said means connected to said shaft including a pair of generally flat rotatable plate members, one of which is secured to said shaft for rotation therewith and the other of which is mounted on said shaft for sliding and rotating movement with respect thereto, said members having means thereon for transferring rotary movement of said shaft to movement of said shoe assemblies, said means on said members comprising a pair of shoulders on one of said members and a plurality of tabs extending generally axially relative to the shaft on the other member, two of which extend in one generally axial direction and are engaged by said shoulders and two others of which extend in an opposite generally axial direction and engage said shoe assemblies.

2. Brake apparatus for a vehicle wheel comprising a disc brake and parking brake apparatus, said disc brake including a disc member secured to an axle extending through a tubular housing and a caliper assembly straddling said disc member, said parking brake apparatus comprising support means connected to said tubular housing, said disc member having an annular drum surface formed thereon inwardly of its outer peripheral portion, said support means including an anchor member, first and second brake shoe assemblies each having one end adjacent and engageable with said anchor member, an adjustable strut between the other ends of the brake shoe assemblies, a shaft extending through said anchor member, means for attaching to one end of said shaft for rotating the same, an actuating plate attached to the other end of said shaft, said plate having arms extending in opposite directions away from said shaft, a shoe engaging generally flat plate member adjacent said plate and having an elongated opening therein through which said shaft extends, said shoe engaging generally flat plate member having a first set of tabs extending therefrom in one generally axial direction relative to the shaft and engaging said arms, and a second set of tabs extending therefrom in an opposite generally axial direction relative to the shaft and engageable respectively with the upper edge of the upper end of a web of one shoe assembly and the lower edge of the upper end of a web of the other shoe assembly.

3. Apparatus as set forth in claim 2 wherein said elongated opening in said shoe engaging member has a width approximately equal to the diameter of said shaft and a length greater than the diameter of said shaft to permit sliding as well as rotary movement of said plate with respect to said shaft.

4. Apparatus as set forth in claim 3 wherein said arms of said actuating plate have elongated edges thereon along which said first set of tabs on said shoe engaging member slide when said shoe engaging member slides with respect to said shaft.

5. Apparatus as set forth in claim 4 wherein said shaft has at least one flat portion on said other end thereof, said actuating plate having an opening mating with said other end of said shaft, and retaining means for maintaining said actuating plate on said shaft.

6. Apparatus as set forth in claim 2 wherein said actuating plate includes prevent means for preventing improper installation on said shaft.

7. Apparatus as set forth in claim 6 wherein said prevent means includes a portion of said plate offset in an axial direction from said plate, said offset portion engaging said shoe engaging member and preventing installation of said plate if it is improperly positioned on said shaft.

8. Apparatus as set forth in claim 7 wherein said elongated opening in said shoe engaging member has a width approximately equal to the diameter of said shaft and a length greater than the diameter of said shaft to permit sliding as well as rotary movement of said plate with respect to said shaft.

9. Apparatus as set forth in claim 8 wherein said arms of said actuating plate have elongated edges thereon along which said first set of tabs on said shoe engaging member slide when said shoe engaging member slides with respect to said shaft.

10. Apparatus as set forth in claim 9 wherein said shaft has at least one flat portion on said other end thereof, said actuating plate having an opening mating with said other end of said shaft, and retaining means for maintaining said actuating plate on said shaft.

* * * * *